United States Patent [19]

Ota et al.

[11] Patent Number: 5,586,217

[45] Date of Patent: Dec. 17, 1996

[54] MIN/MAX COMPUTING CIRCUIT FOR FUZZY INFERENCE

[75] Inventors: Ken Ota, Higashimine-machi, Japan; William C. Archibald, Austin, Tex.

[73] Assignee: Motorola Inc., Schaumburg, Ill.

[21] Appl. No.: 346,650

[22] Filed: Nov. 30, 1994

[51] Int. Cl.$^6$ .............................. G06G 7/00; G06F 17/00; G06F 15/18

[52] U.S. Cl. .................................. 395/3; 395/61

[58] Field of Search ............................. 395/3, 61

[56] References Cited

U.S. PATENT DOCUMENTS

| | | | |
|---|---|---|---|
| 5,140,669 | 8/1992 | Zhang | 395/3 |
| 5,280,624 | 1/1994 | Ikeda | 395/3 |
| 5,299,283 | 3/1994 | Hamamoto | 395/3 |
| 5,398,299 | 3/1995 | Ota et al. | 395/3 |

*Primary Examiner*—Robert W. Downs
*Assistant Examiner*—A. Katbab
*Attorney, Agent, or Firm*—Elizabeth A. Apperley

[57] ABSTRACT

A fuzzy logic system arranges fuzzy inference rules into groups corresponding to their respective output labels. Within the fuzzy inference rules, the graded input labels are ordered in numerical order according to the grades of each input label such that all of the graded input labels utilized within any particular group of fuzzy inference rules (for each output label) is ordered in numerical order. The minimum bit state for each of the fuzzy inference rules is selected by choosing the grade within that fuzzy inference rule closest in rank to zero. The maximum bit state for each output label is selected by choosing from the minimum bit states for the various inference rules for each output label the grade farthest in rank from zero. The graded input label represented by the maximum bit state is then output as the final value for each particular output label.

13 Claims, 10 Drawing Sheets

| INPUT LABELS | H | C | E | L | D | G | M | B | I | F | K | A | N | J | |
|---|---|---|---|---|---|---|---|---|---|---|---|---|---|---|---|
| GRADES | .9 | .7 | .65 | .62 | .55 | .45 | .2 | .06 | 0 | 0 | 0 | 0 | 0 | 0 | |
| CODED RULES (7) | 0 | 0 | 1 | 0 | 0 | 0 | 0 | 0 | 0 | 0 | 1 | 0 | 0 | ①  | } Z |
| (6) | 1 | 0 | 0 | 0 | 0 | 0 | 0 | 0 | ① | 0 | 0 | 0 | 0 | | |
| (5) | 0 | 1 | 0 | 0 | ① | 0 | 0 | 0 | 0 | 0 | 0 | 0 | 0 | | } Y |
| (4) | 0 | 0 | 0 | 0 | 0 | 1 | 1 | 0 | 0 | 0 | 0 | 0 | ① | 0 | OUTPUT LABELS |
| (3) | 0 | 0 | 1 | 0 | 0 | 0 | 0 | 0 | 0 | ① | 0 | 0 | 0 | | |
| (2) | 0 | 1 | 0 | 0 | 0 | 0 | 0 | ① | 0 | 0 | 0 | 0 | 0 | | } X |
| (1) | 0 | 0 | 0 | 0 | 0 | 0 | 0 | 1 | 0 | 0 | 0 | ① | 0 | 0 | |

|        | 0.9 | 0.7 | 0.65 | 0.62 | 0.55 | 0.45 | 0.2 | 0.06 | 0.0 |   |
|--------|-----|-----|------|------|------|------|-----|------|-----|---|
| RULE (1) | if  | C   | E    |      |      |      |     | B and | (A) |   |
| RULE (2) | if  | C   |      |      | and  |      |     | (B)  |     |   |
| RULE (3) | if  |     | E    |      | and  |      |     | (F)  |     | } OR X |
| RULE (4) | if  |     |      |      |      | G and | M and | (N) |     |   |
| RULE (5) | if  | C   |      | and  | (D)  |      |     |      |     | } OR Y |
| RULE (6) | if  | H   |      |      | and  |      |     | (I)  |     |   |
| RULE (7) | if  |     |      | L    |      | and  |     | J and | (K) | } OR Z |

*FIG.3*

ENCODED RULE (1)

| A | B | C | D | E | F | G | H | I | J | K | L | M | N |
|---|---|---|---|---|---|---|---|---|---|---|---|---|---|
| 1 | 1 | 0 | 0 | 0 | 0 | 0 | 0 | 0 | 0 | 0 | 0 | 0 | 0 |

*FIG. 4*

ENCODED RULE (5)

| A | B | C | D | E | F | G | H | I | J | K | L | M | N |
|---|---|---|---|---|---|---|---|---|---|---|---|---|---|
| 0 | 0 | 1 | 1 | 0 | 0 | 0 | 0 | 0 | 0 | 0 | 0 | 0 | 0 |

| CODED RULES | INPUT LABELS | | | | | | | | | | | | | | OUTPUT LABELS |
|---|---|---|---|---|---|---|---|---|---|---|---|---|---|---|---|
| | A | B | C | D | E | F | G | H | I | J | K | L | M | N | |
| (7) | 0 | 0 | 0 | 0 | 0 | 0 | 0 | 0 | 0 | 1 | 1 | 1 | 0 | 0 | Z |
| (6) | 0 | 0 | 0 | 0 | 0 | 0 | 0 | 1 | 1 | 0 | 0 | 0 | 0 | 0 | Z |
| (5) | 0 | 0 | 1 | 0 | 0 | 0 | 0 | 0 | 0 | 0 | 0 | 0 | 0 | 0 | Z |
| (4) | 0 | 0 | 0 | 0 | 0 | 0 | 1 | 0 | 0 | 0 | 0 | 0 | 1 | 1 | Y |
| (3) | 0 | 0 | 0 | 0 | 1 | 1 | 0 | 0 | 0 | 0 | 0 | 0 | 0 | 0 | X |
| (2) | 0 | 1 | 0 | 0 | 0 | 0 | 0 | 0 | 0 | 0 | 0 | 0 | 0 | 0 | X |
| (1) | 1 | 1 | 0 | 1 | 0 | 0 | 0 | 0 | 0 | 0 | 0 | 0 | 0 | 0 | X |

| | INPUT LABELS | H | C | E | L | D | G | M | B | I | F | K | A | N | J | OUTPUT LABELS |
|---|---|---|---|---|---|---|---|---|---|---|---|---|---|---|---|---|
| | GRADES | .9 | .7 | .65 | .62 | .55 | .45 | .2 | .06 | 0 | 0 | 0 | 0 | 0 | 0 | |
| CODED RULES | (7) | 1 | 1 | 1 | 1 | 1 | 1 | 1 | 1 | 1 | 1 | 1 | 1 | 0 | (1) | Z |
| | (6) | 1 | 1 | 1 | 1 | 1 | (1) | 0 | 1 | 0 | 0 | 0 | 0 | 0 | 0 | Z |
| | (5) | 1 | 1 | 1 | (1) | 0 | 1 | 0 | 0 | 0 | 0 | 0 | 0 | 0 | 0 | Y |
| | (4) | 1 | 1 | 1 | 1 | 1 | 1 | 0 | 0 | 1 | 1 | 1 | 1 | (1) | 0 | X |
| | (3) | 1 | 1 | 1 | 1 | 1 | 1 | 1 | (1) | 1 | 1 | 0 | 1 | 0 | 0 | X |
| | (2) | 1 | 1 | 1 | 1 | 1 | 1 | 1 | 1 | 0 | (1) | 0 | 0 | 0 | 0 | X |
| | (1) | 1 | 1 | 1 | 1 | 1 | 1 | 1 | 1 | 1 | 1 | (1) | 0 | 0 | 0 | X |

MIN/MAX COMPUTING CIRCUIT FOR FUZZY INFERENCE

FIELD OF THE INVENTION

This invention relates in general to a fuzzy inference system utilized to control various consumer electronics, and more particularly, to a system and circuit for min/max computations of fuzzy inference systems.

BACKGROUND OF THE INVENTION

Fuzzy logic systems using fuzzy inference rules are widely used in the art to control various consumer electronics, household appliances, automobile systems, cameras, etc. These systems generally operate in the following manner:

1) input data, such as temperature, velocity, humidity, etc., is input to a fuzzifier;

2) the fuzzifier compares the input data to sets of predetermined parameters, or input membership functions that define the positions or shapes of input labels. The input data is compared to a given number of input labels within each input membership function and a grade is determined for each input label. The grade represents the conformity each input data has to that designated input label;

3) the graded input labels are input to a min/max computation circuit (often called inference logic) where the graded input labels are compared to a set of rules and sets of output labels are determined;

4) the output labels are defuzzified, meaning that a Center of Gravity (COG) is calculated among the output labels to determine a single point ("crisp signal") most representative of the output data. The resultant signal is a control signal, such as a signal controlling the speed of an automobile system or the temperature control in an air-conditioning system.

FIG. 1 shows the above process in block form. Input data is input to fuzzifier 10 where the data is graded according to membership functions stored in memory 12. FIG. 2 shows an example of one such membership function. Data stored in membership function memory 12 would be similar to that of the graph. Each membership function is divided into pre-defined labels, or input labels. In FIG. 2, the input labels include $L_1$ through $L_5$.

Assume for example that the variable unit input into fuzzifier 10 is temperature, and the input temperature is about 25 degrees C. as shown. This data point has fallen within three pre-defined input labels: $L_2$, $L_3$, and $L_4$. The grade for input label $L_2$ would be 27%, for $L_3$ would be 65%, and for $L_4$ would be 7%. For input labels $L_1$ and $L_5$, the grades are both zero since the input data point does not fall within either of these input label ranges.

Referring again to FIG. 1, the graded input labels are sent to inference logic 14 where they are compared to a set of rules stored in rule memory 16. Each of these rules are associated with one output label, and there may be any number of output labels. The purpose of inference logic 14 is to determine which of the graded input labels within any given inference rule has a minimum graded value, and then which of the minimum graded values for each of the output labels has a maximum graded value. Generally, these operations require many repetitions of numerous comparisons of the input labels to each other to determine the minimums, and then maximums of those minimums.

The conditions in the rules are often referred to as "antecedents" and the resultants of the rules are often referred to as "consequents".

Depending upon the rules determined by the user, there may be several different categories of consequents. For instance, using the example of oven power control, the consequents may be grouped in one of several output labels, such as the over-simplified "down", "up", and "as-is". This step may be better understood with reference to the following rules. In these rules, there are graded input labels A through N which are fuzzified temperature input labels (no relation to the data in FIG. 2) input into inference logic 14. Rules 1 through 7 have been stored in rule memory 16 with consequents X, Y, and Z representing the output labels "down", "up", and "as-is" respectively.

The rules are:

| Rule (1) | if A and B       | then X |
| Rule (2) | if B and C       | then X |
| Rule (3) | if E and F       | then X |
| Rule (4) | if G and M and N | then X |
| Rule (5) | if C and D       | then Y |
| Rule (6) | if H and I       | then Z |
| Rule (7) | if J and K and L | then Z |

The grades of the input labels in the antecedents, are:

| A = 0 | B = 0.06 | C = 0.7  | D = 0.55 | E = 0.65 |
| F = 0 | G = 0.45 | H = 0.9  | I = 0    | J = 0    |
| K = 0 | L = 0.62 | M = 0.2  | N = 0    |          |

It should be noted in the above rules that the "and" function in each rule represents "select the minimum". Therefore, in rule (1), "if A and B then X" means that X will take the value of the minimum of A and B. Each "then" in the fuzzy rules indicates a substitution of the minimum grade into the consequent (s). Substituting the grades into A and B yields, "if 0 and 0.06, then X=0" since the value of A (0) is less than the value of B (0.06).

The selection of the minimum value is only the first step in the min/max operation of inference logic 14. After the minimum for each rule is selected, the maximum of all the consequents for each output label X, Y, and Z is found. Accordingly, the consequents of rules 1 through 4 are compared and the maximum is determined. This maximum is the output label "X". Rule 5 is the only rule applicable to output label "Y", so the minimum is also the maximum. The maximum of rules 6 and 7 will be the output label for "Z".

The output labels are sent from inference logic 14 to defuzzifier 18. Defuzzifier 18 takes the grades of the output labels, X, Y, and Z, and finds a center of gravity (COG) of all three (or all output labels depending upon the number) by weighting the values of all three to determine a gravity center point.

Now, referring again to the min/max operation of inference logic 14, there may be many input labels for each input variable. The more the total input labels, the more comparisons will be required in the min/max process. Processing this large amount of data in conventional fuzzy logic systems is slow. Accordingly, fuzzy control systems have been limited generally to low speed control applications such as home appliances. To advance fuzzy control systems into more complicated control systems where they are needed, such as automobile brake control or suspension control, computing speeds must be increased by a factor of about 1000. Increasing the speed requires synergistically tuning three different stages of the fuzzy control system logic: the grade computations in fuzzifier 10, the min/max operations in inference logic 14, and the calculation of the COG in defuzzifier 18.

Fuzzy logic min/max operations have been implemented in both software and hardware. With the large number of comparisons, software implementations are sluggish and limited. Hardware implementations are also slow as well as expensive since the large number of comparisons requires extensive hardware architecture. Because of these limitations, conventional fuzzy logic systems have not been able to increase the computing speed enough to increase the scope of use of fuzzy logic.

SUMMARY OF THE INVENTION

According to the present invention, fuzzy inference rules are arranged into groups corresponding to their respective output labels. Within the fuzzy inference rules, the graded input labels are ordered in numerical order according to the grades of each input label such that all of the graded input labels utilized within any particular group of fuzzy inference rules (for each output label) is ordered in numerical order. The minimum bit state for each of the fuzzy inference rules is selected by choosing the grade within that fuzzy inference rule closest in rank to zero. The maximum bit state for each output label is selected by choosing from the minimum bit states for the various inference rules for each output label the grade farthest in rank from zero. The grade of the graded input label represented by the maximum bit state is then output as the final value for each particular output label.

BRIEF DESCRIPTION OF THE DRAWINGS

FIG. 3 is a table showing input labels plotted in numerical order with the appropriate fuzzy inference rules.

FIG. 4 shows an encoded fuzzy inference rule which is Rule 1 for the example used to explain the present invention.

FIG. 5 shows an encoded fuzzy inference rule which is Rule 5 for the example used to explain the present invention.

FIG. 6 shows the encoded fuzzy inference rules used to explain the present invention organized into a table.

FIG. 7 shows the table of FIG. 6 with input labels ordered in numerical order according to their graded values.

FIG. 8 shows the table of FIG. 7 adjusted.

DETAILED DESCRIPTION OF THE INVENTION

The present invention describes a method of reducing the number of input label grade comparisons to increase the speed of calculation by a factor of nearly 1000 over conventional fuzzy logic systems. Although the present invention method can readily be implemented in software, one skilled in the art will recognize that hardware implementations are faster than software implementations. The present invention further shows a preferred embodiment of a hardware implementation of the present invention.

For consistency, the example from above having the 7 fuzzy inference rules, A through N graded input labels, and X, Y, and Z output labels, will be used to explain the method described by the present invention.

FIG. 3 shows the 7 fuzzy inference rules listed in order, and the grades of the graded input labels, or antecedents, ordered in descending order from 1 to 0. This table makes the min/max process easy to accomplish. First, one need only look for the last antecedent in the row (closest to zero) for each fuzzy inference rule to perform the minimum operation. In the present example, this will be the value furthest to the right. In FIG. 3, all antecedents having at least one circle around it has the minimum value of the various grades for that particular fuzzy inference rule. The maximum operation is then taken for each output label. For instance, for the X output label (rules 1 through 4), the minimum grades for each of the fuzzy inference rules relate to input labels A, B, F, and N, respectively. To determine the maximum of these 4, the antecedent farthest to the left (farthest away from zero) in the table is determined (indicated by a double circle). In this case, antecedent B is the farthest to the left, or farthest from zero, with A, F, and N all equaling zero. Accordingly, the graded value of antecedent B is determined as the final value of output label X. Output label Y is easy since only rule 5 applies to this output label. Output label Z has three antecedents all equaling zero, and the value of these three, or "0" is determined to be the final value of output label Z.

Figure 1:
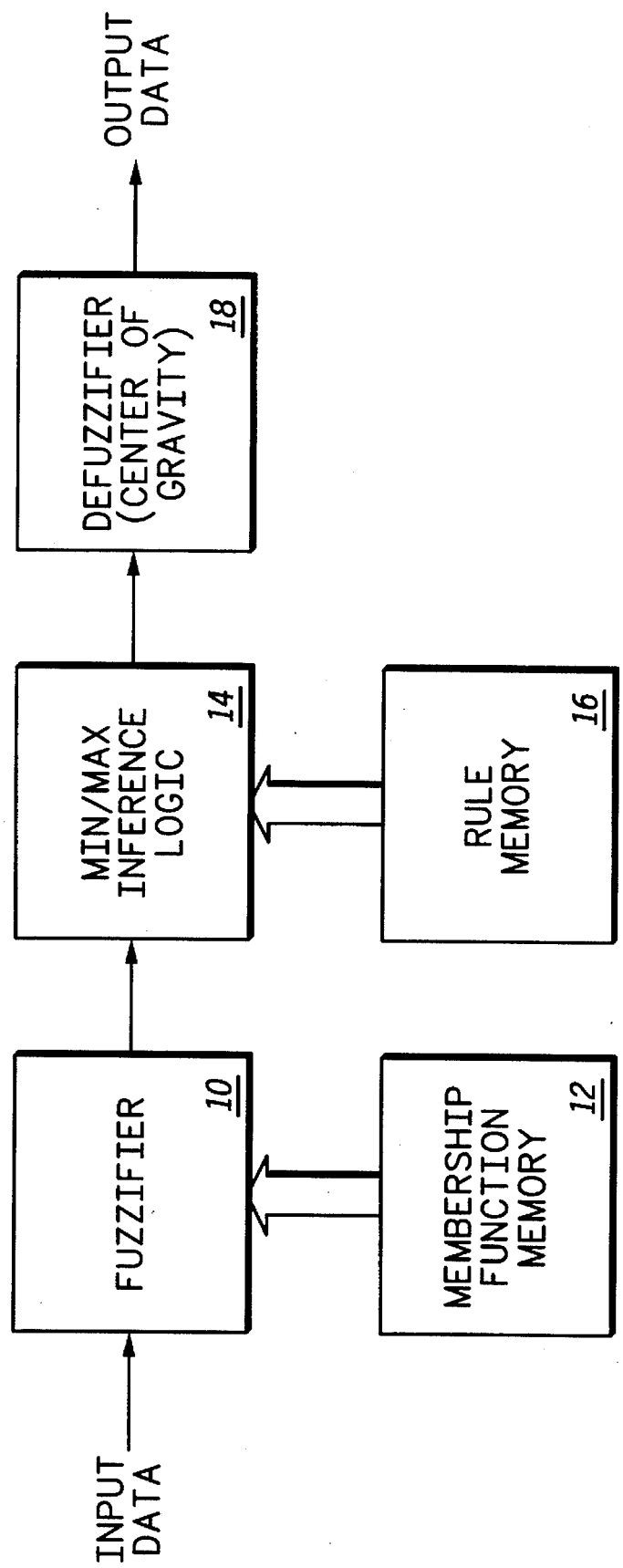
FIG. 1 is a simplified block diagram of a fuzzy logic system.
Figure 2:
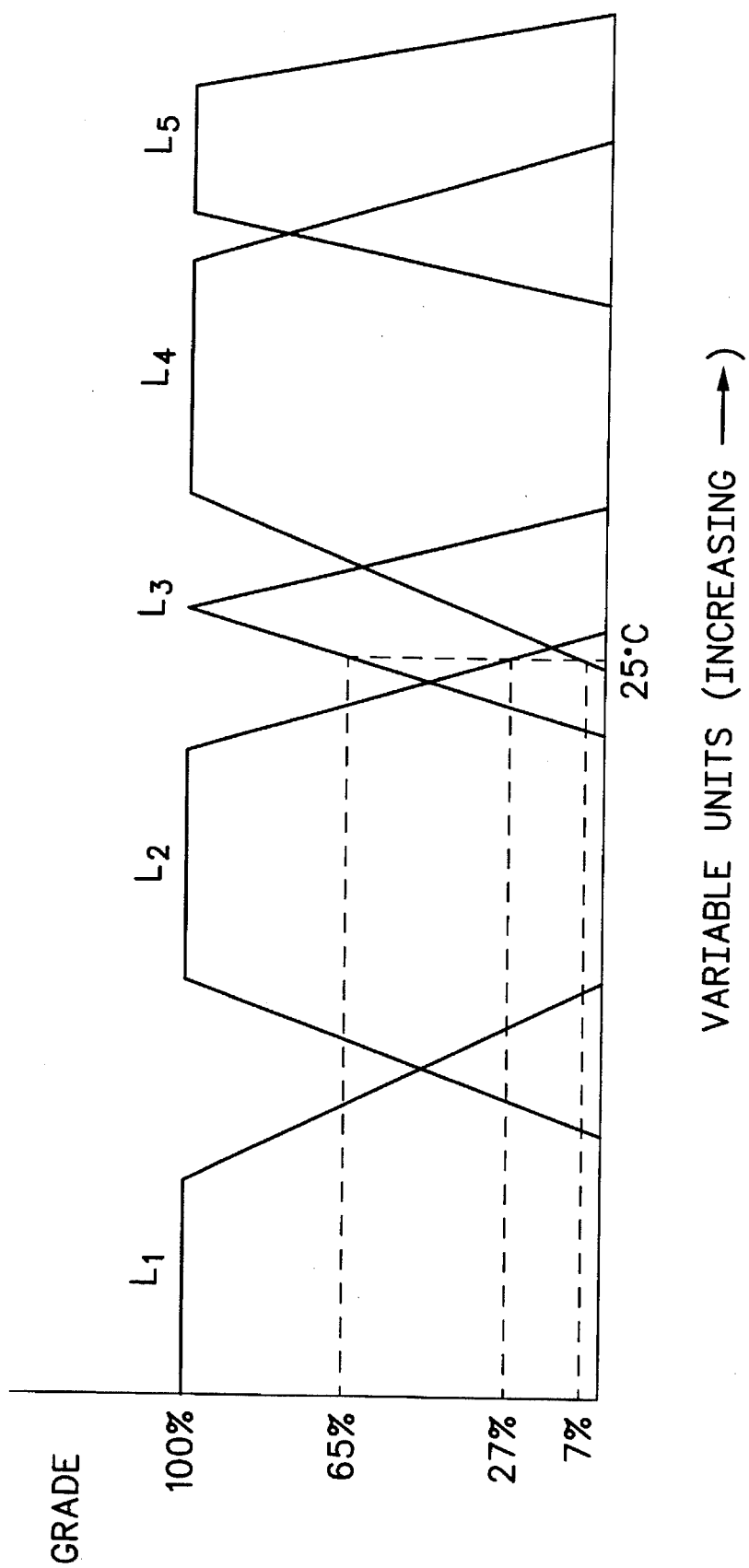
FIG. 2 shows in graphical form how an input variable is graded in a membership function in a fuzzifier.

These three output labels are next output to defuzzifier 18 of FIG. 1 where the COG is determined.

Theoretically, then, the method of reducing the number of comparisons of antecedents includes ordering the input labels in numerical order according to their respective fuzzy inference rules, with each fuzzy inference rules grouped according to their output labels. In this manner, the minimums and maximums can be readily obtained without any comparisons made.

To implement the method of the present invention in digital machine operable format, each fuzzy inference rule is encoded into valid/invalid bits using a 1 or 0 (high or low). For instance, FIG. 4 shows Rule 1 encoded using ones and zeros. The ones in FIG. 4 represent antecedents that are at issue in that particular fuzzy inference rule. Rule 1 states "if A and B". Therefore, encoded Rule 1 assigns a 1 to the locations for A and B. FIG. 5 shows another fuzzy inference rule, Rule 5 where antecedents C and D are resolved, and a 1 is encoded in the locations of antecedents C and D. Encoding all fuzzy inference rules for all antecedents and arranging these in table form yields the table of FIG. 6.

Figure 7:
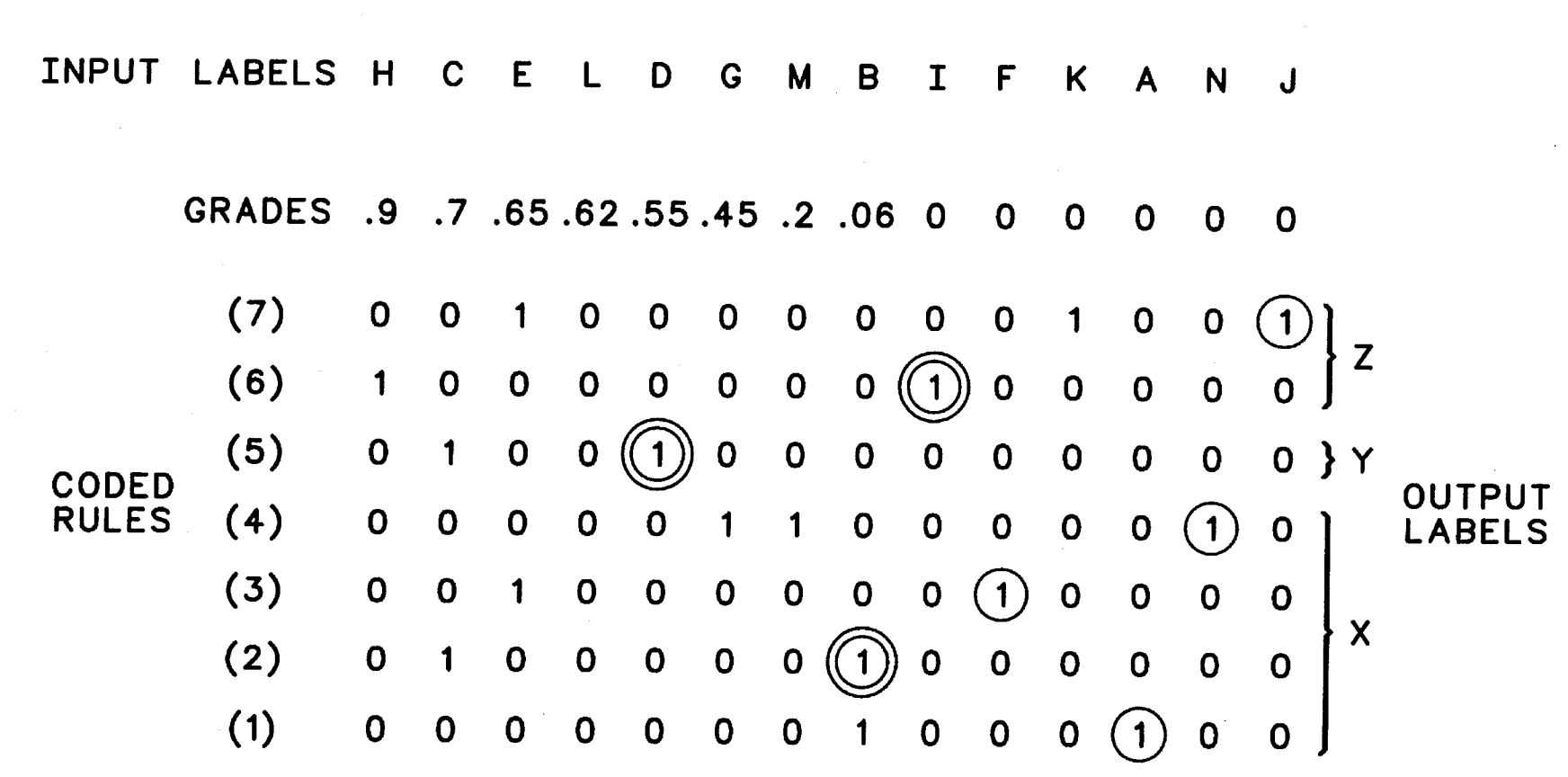

The table of encoded valid/invalid bits shown in FIG. 6 is ordered in numerical order according to input label grades as shown in FIG. 7. This table, FIG. 7, now is the encoded equivalent of the table in FIG. 3. Accordingly, the valid/invalid bit for each fuzzy inference rule closest to zero, or farthest to the right in this table, will have the minimum value (indicated by at least one circle). For each of the output labels and their associated fuzzy inference rules, the minimum valid/invalid bit farthest from zero, or in the table farthest to the left, will be the final maximum graded value for that output label (indicated by the double circle).

To implement the above operation into a hardware scheme, all valid/invalid bits greater than the valid/invalid bit representing the minimum bit state, or in this figure, all values to the left of the minimum bit state, in each of the fuzzy inference rules are defaulted to ones as shown in FIG. 8.

Figure 9:
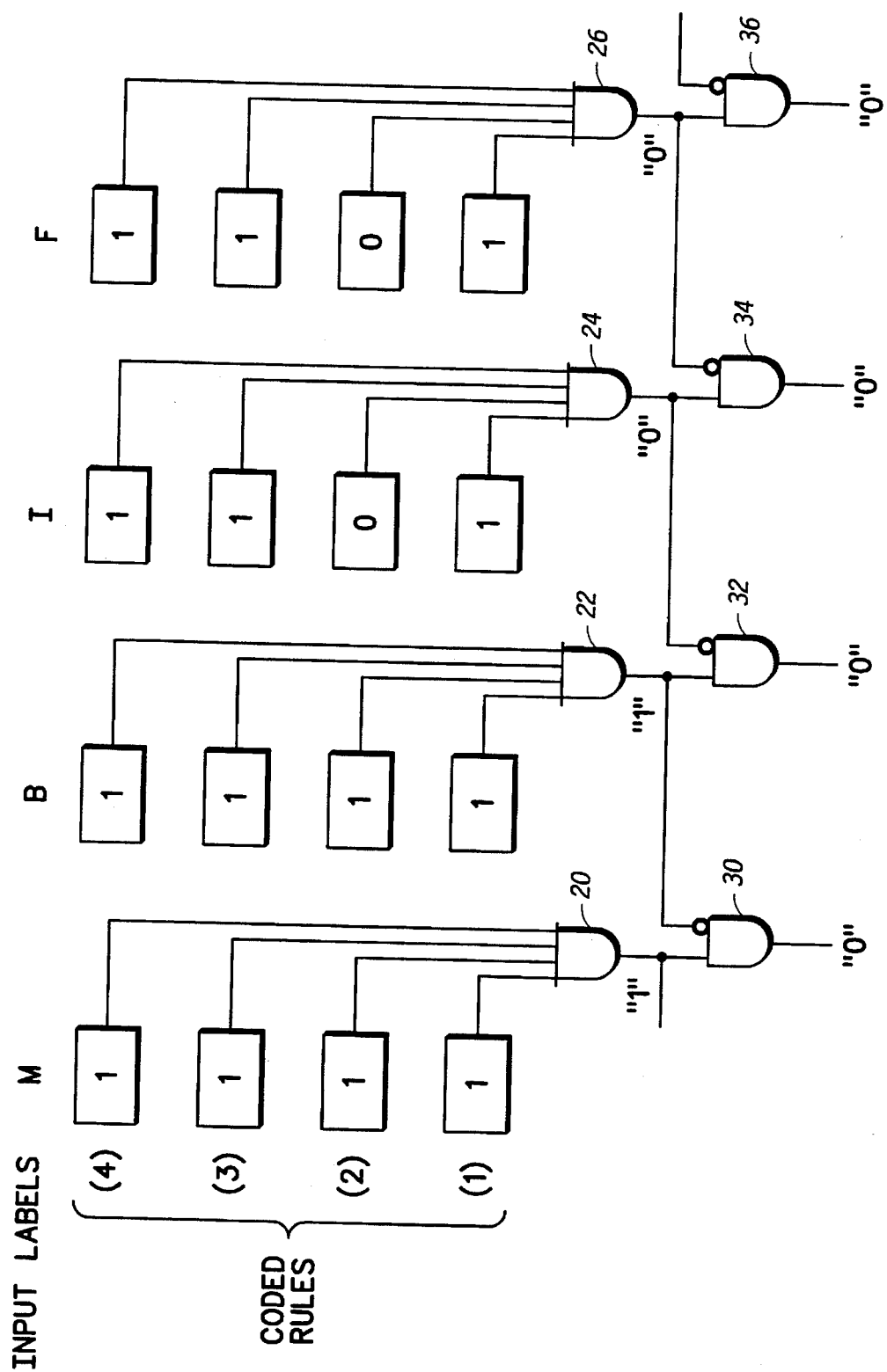
FIG. 9 shows the method of processing the information in the table of FIG. 8 according to the present invention.

FIG. 9 shows a preferred embodiment of the minimum/maximum operations using, for example, the rules for output label X, rules 1 through 4, and a few of the input labels, M, B, I, and F.

In FIG. 9, each of the valid/invalid bits for the output label X for each input label M, B, I, and F are input into circuits 20, 22, 24, and 26, respectively where a minimum bit state for each is chosen. The minimum bit states are then output from circuits 20 through 26 to circuits 30 through 36. As indicated, when all the valid/invalid bits for the 4 fuzzy inference rules for input label M are input to circuit 20, a "1" is output. Similarly for input label B, a "1" is output. For both input labels I and F, a "0" is output. The final maximum bit state is determined by circuits 30, 32, 34, and 36. There are two inputs to each of the circuits 30, 32, 34, and 36. The input from the input label having the lesser graded value is inverted. For instance, the input to circuit 30 from input label M having a grade of 0.02 is input directly while the input from input label B having a grade of 0.06 is inverted by inverter 31. Circuit 30 will then determine the maximum value, or for circuit 30, "0". For this example representing output label X, only circuit 32 will output a "1". This will indicate that the grade of input label B is the final graded value for output label X. A similar process will be performed for output labels Y and Z in the present example.

Figure 10:
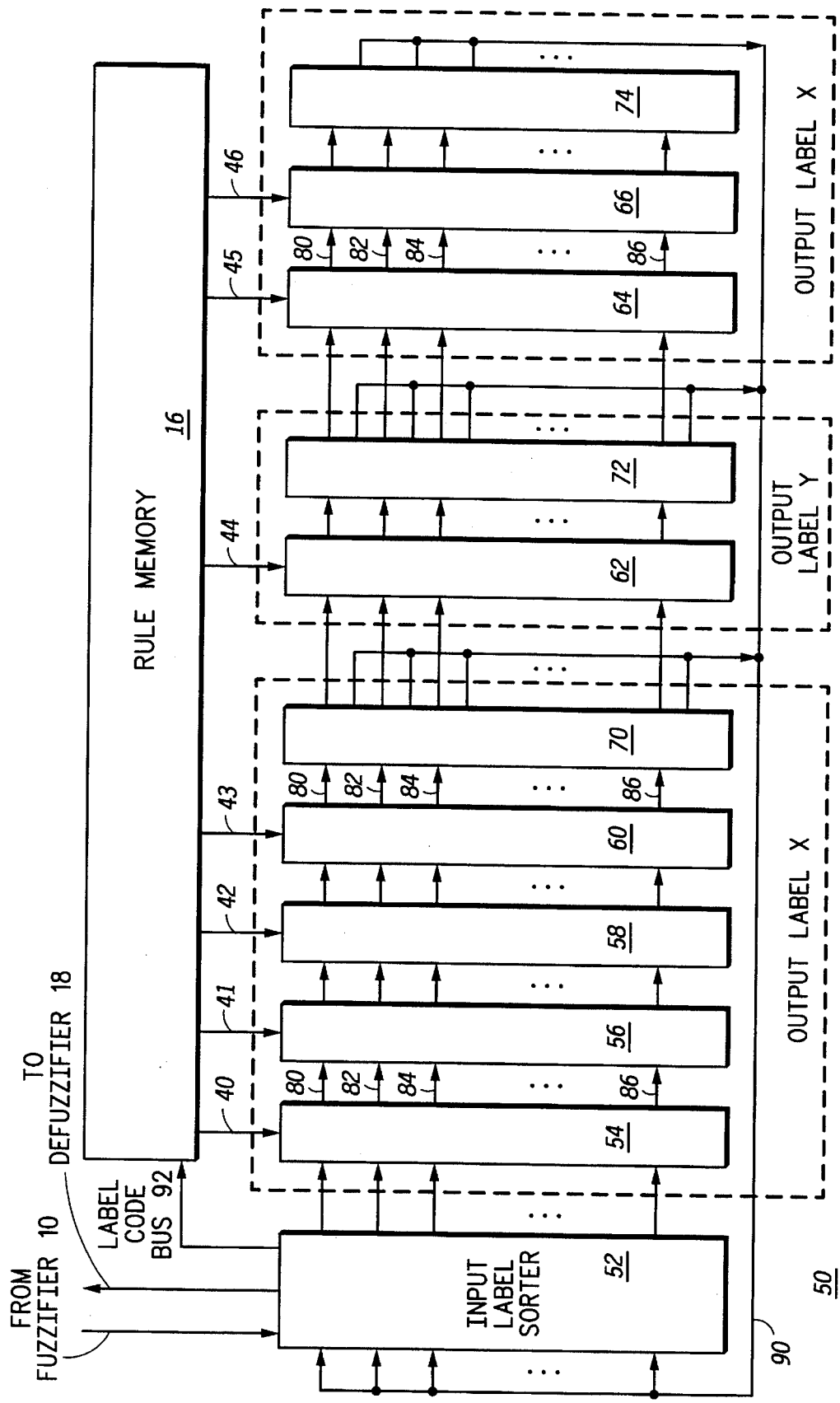
FIG. 10 is a block diagram of a fuzzy inference logic circuit according to the present invention.

FIG. 10 shows a schematic of a preferred embodiment of a min/max circuit 50 according to the present invention. Min/max circuit 50 is shown in FIG. 10 as having the same number of input labels, fuzzy inference rules, and output labels as the above described example, with the elements correlating to each other in the same manner as the example. This will facilitate the description of the invention as continued from above. However, a designer will use the same structure with differing numbers of input labels, fuzzy inference rules, and output labels for each specific design situation.

Min/max circuit 50, for the above example having input label grades A through N and output labels X, Y, and Z, comprises an input label sorter 52, a series of sorted rule sort registers 54 through 66 corresponding to rules 1 through 7, and min/max selectors (or computing networks) 70 through 74 corresponding to output labels X, Y, and Z. Rule memory 16 is coupled to each of the rule sort registers 54 through 66 to supply the coded rule valid/invalid bits such as that shown in FIGS. 4 and 5.

Input label sorter 52 is coupled to fuzzifier 10 and receives the graded input labels A through N. Input label sorter 52 is also coupled to rule memory 16 through label code bus 92, through which input label sorter 52 directs to rule memory 16 which input label is being accessed at a given time. Input label sorter 52 also tells rule memory 16 which lines 80 through 86 of rule sort registers 54 through 66 that the valid/invalid bits of the encoded rules for the respective input label should be sent to. Rule memory 16 then sends the valid/invalid bits along lines 40 through 46 to rule sort registers 54 through 66 to the location directed by input label sorter 52. For example, if A through C have already been read by input label sorter 52, valid/invalid bits will be registered in lines 80, 82, and 84 of rule sort registers 54 through 66 for input labels C, B, and A respectively. When D is read, input label sorter 52 will direct rule memory 16 to send the valid/invalid bits correlating to input label D to the second location within rule sort registers 54 through 66, or line 82. Input labels B and A are shifted down.

To explain in more detail, each input label is read by input label sorter 52 in order beginning from input label A. Input label sorter 52 will store A in a first location in input label sorter 52. Input label sorter 52 will then send a signal along label code bus 92 to rule memory 16 directing rule memory 16 to register the valid/invalid bits for input label A in the first location of each of the rule sort registers 54 through 66 (shown as line 80 in FIG. 10). As B is received, input label sorter 52 will determine if B is greater or less than A. In the above example, B is in fact greater than A. Input label sorter 52 will output to each of the rule sort registers a shift down signal (shown in FIG. 10 as "S") indicating that data in line 80 must be shifted down to line 82. If a line of data is shifted down, all subsequent lines below will also be shifted down. Therefore, all lines from 80 down will be shifted. Input label sorter 52 then registers input label B into the first location in input label sorter 52 and input label A into the second location of input label sorter 52. A signal is then sent to rule memory 16 directing it to register input label B valid/invalid bits in line 80.

Next, input label C is input to input label sorter 52. Since C is greater than B, C is registered in the first location in input label 52 with A and B shifted down in order. Similarly, a shift down signal is sent to lines 80 through 86 shifting both A and B down to lines 84 and 82 respectively. Input label sorter 52 directs rule memory 16 to register the valid/invalid bits associated with input label C on line 80. As input label D is received, input label sorter 52 recognizes that D is less than C yet greater than B. Accordingly, a shift down signal is sent to lines 82 through 86 shifting B and A down further while leaving C in place in both input label sorter 52 and rule sort registers 54 through 66. Input label sorter 52 then directs rule memory 16 register the appropriate valid/invalid bits for input label D on line 82 in rule sort registers 54 through 66.

One will recognize that there could be an indefinite number of graded input labels processed within min/max circuit 50. However, practically speaking there are only a certain number of qualitative input values that are useful since the majority of input labels are generally zero. A designer of a fuzzy logic system will usually limit the number of input labels registered in rule sort registers 54 through 66. All graded input labels will be input to input label sorter 52, but only a certain number of significant graded input labels as determined by the designer will be registered in rule sort registers 54 through 66. In the present preferred embodiment, input label sorter 52 and rule sort registers 54 through 66 are designed for 16 total input labels.

Input label sorter 52 continues to sort the input labels, inputting the various valid/invalid bits into their appropriate locations within rule sort registers 54 through 66, until all input labels have been read and sorted by input label sorter 52. The majority of those input labels having a grade of zero will usually not be registered within rule sort registers 54 through 66.

Referring again briefly to FIG. 8 and the accompanying discussion above, all valid/invalid bits of each input label having a grade greater than the minimum for each rule will default to a "1" whether that value is a zero or a "1" originally. The operation of FIG. 8 of converting all valid/invalid bits of larger value than the minimum to a "1" is accomplished in min/max circuit 50 of FIG. 10 as the valid/invalid bits of each input label is input in its sorted place in rule sort registers 54 through 66. Every time a valid/invalid bit of "1" is shifted down, a "1" is left in its original place. This "1" will not be changed to a zero until the rule sort registers are all reset for a new set of input labels. Further, when rule memory 16 inserts a valid/invalid bit of "1" into the order of rule sort registers 54 through 66 other than at the beginning (such as D located after C in order), rule memory 16 will direct all valid/invalid bits from the specified location and above to register a "1".

This concept is better understood referencing the table of FIG. 7. When input label E is received, input label sorter 52 will sort input label E below input label C. Rule memory 16 will then register valid/invalid bits of "1" within rule sort registers 54 and 66, line 82. Further, the valid/invalid bits within rule sort registers 54 and 66, line 80, will be changed to a "1".

After all input labels have been input, min/max selectors 70, 72, and 74 perform the minimum/maximum operations. Min/max selector 70 will perform the operations on registers 54 through 60, min/max selector 72 will perform the operations on register 62, and min/max selector 74 will perform the operations on registers 64 and 66. A read enable signal (RE) will be generated by min/max selectors 70 through 74, and the RE signals are fed back to input label sorter 52 along line 90. In this preferred embodiment, line 90 is a 16 bit line representative of the 16 input labels capable of being accessed in input label sorter 52 and registered in rule sort registers 54 through 66. The RE signal sent to input label sorter 52 will include a "high" for each input label chosen as the final maximum output label grade by min/max selectors 70 through 74. Input label sorter 52 then outputs to defuzzifier 18 the input label grades selected according to the RE signals from min/max selectors 70–74.

Figure 11:
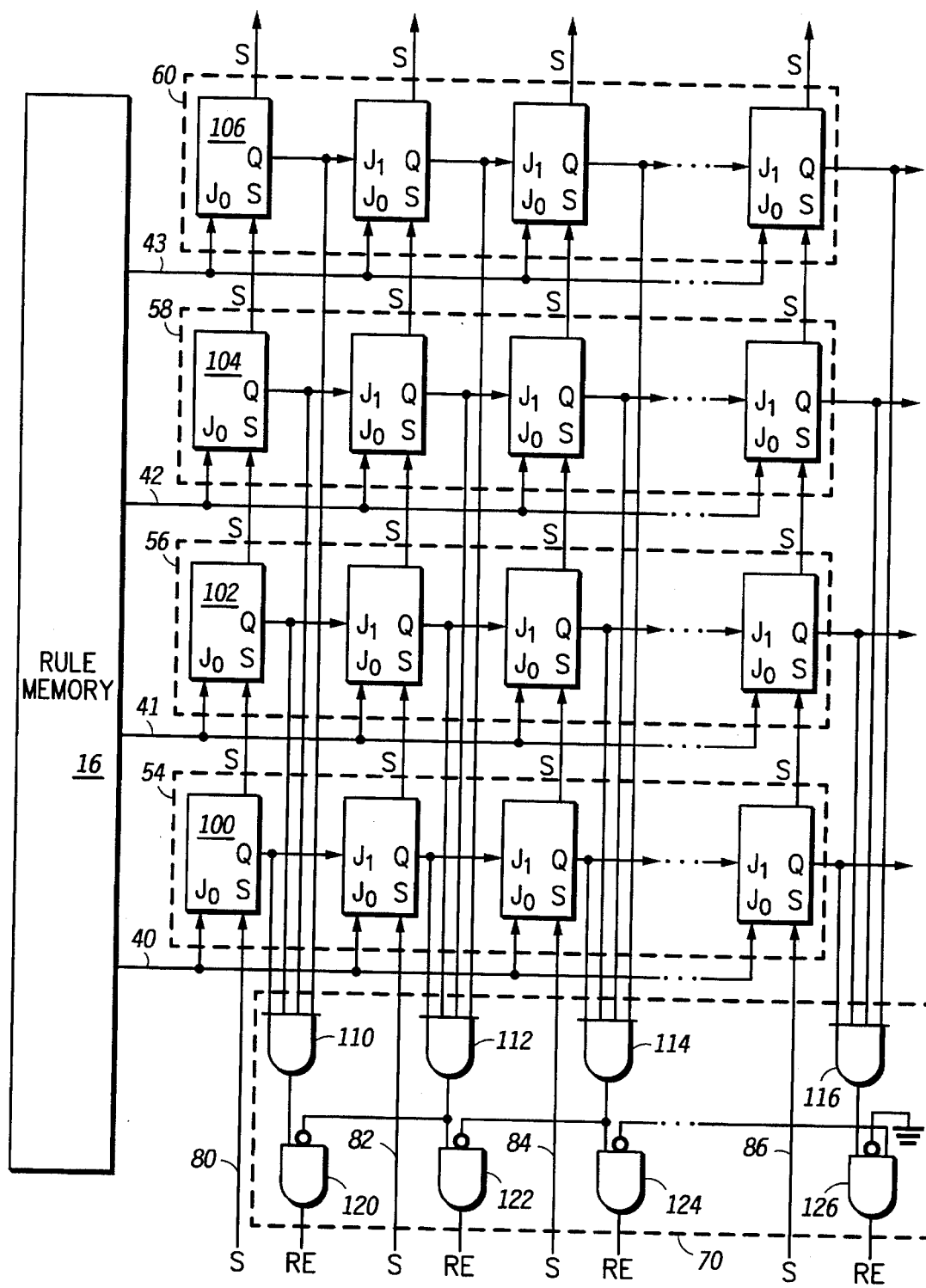
FIG. 11 is a more detailed portion of the circuit of FIG. 10 according to the present invention.

FIG. 11 shows the circuitry of rule sort registers 54 through 66, and min/max selectors 70 through 74. In FIG. 11, only registers 54 through 60 and min/max selector 70 are shown, which all relate to output label X.

Each of the registers comprise a series of 3-type flip-flop circuits, with 16 flip-flops in each rule sort register in the preferred embodiment. Each flip-flop is coupled to rule memory 16 by rule bit lines 40 through 43 and has an "S" input from input label sorter 52. The output of each flip-flop ("Q") is coupled to min/max selector 70. The rule which is followed by the flip-flops is:

when S=0, select $J_0$
when S=1, select $J_1$

In this manner, all flip-flops above those which have been shifted down, or in other words, all those who receive a "0" "S" signal, will read from $J_0$ which is the input from rule memory 16. All flip-flops below that, or those which have received a "1" signal for "S", will register the $J_1$ value which is the output Q from the flip-flop immediately above. The following two rules also apply:

S of a line where the pre-stored data is shifted down is "1".

S of a line where the pre-stored data remains in the flip-flop, or into which a new input label is inserted, is "0".

The operation of the flip-flops of registers 54 through 66 will be understood again using the inputs of input labels A through B.

When input label sorter 52 indicates to rule memory 16 that input label "A" is to be input, rule memory 16 will output a valid/invalid bit of "1" along rule bit line 40, and this "1" is only registered into flip-flop 100 (to input $J_0$) of register 54. Note that at this time, only the S signal along line 80 is "0" and the other S signals along lines 82 through 86 are all "1". Output Q in flip-flop 100 will also now be a "1". When input label "B" is to be input, the "S" signal from input label sorter 52 will be a "1" along lines 82 through 86, and all outputs "Q" in those flip-flops will shift down one to the $J_1$ input of the next bit. Rule memory 16 will send a "1" along lines 40 and 42 to registers 54 and 56.

The operation of min/max selector 70 is also shown in FIG. 11. Recognizing that FIG. 11 shows only those input label registers applicable to output label "X", a series of gates 110 through 116 are shown coupled to the flip-flops, each gate coupled to only those flip-flops in its respective line. For instance, gate 110 is coupled to flip-flops 100, 102, 104, and 106, and determines the minimum bit state of the valid/invalid bits of those four flip-flops. Again it will be noted that there are many lines of gates and flip-flops in min/max circuit 50, but only these four lines are shown in FIG. 11 for demonstrative purposes.

Just as shown in FIG. 9, after gates 110 through 116 have chosen a minimum bit state for each respective line of flip-flops, gates 120, 122, 124, and 126 determine the maximum of the minimum bit states for output label "X". The outputs of gates 120 through 126 are the read enable signals. For that input label which is chosen to represent the output label, a "1" is transmitted back to input label sorter 52 as explained above. For further explanation of the minimum/maximum operation of gates 110 through 126, reference is made to the discussion of FIG. 9 above.

By removing the need to compare each graded input label with all other graded input labels, including the majority of the cases where most of the grades for the input labels are zero, and by using the methods and circuitry taught by the present invention, the processing time of fuzzy systems may be drastically decreased, even up to 1000 times compared to conventional software processing methods. The present invention discloses a method and apparatus that increases the speed of computation for fuzzy systems substantially, thus making fuzzy logic systems feasible, and in fact marketable, for advanced, complex systems.

We claim:

1. In a fuzzy logic system where each input is fuzzified to obtain a number of graded input labels, the graded input labels processed according to a number of fuzzy inference rules to generate a given number of output labels, each of the fuzzy inference rules corresponding to an output label, the fuzzy inference rules determining first which graded input label processed by each fuzzy inference rule has a minimum value, and second, determining which of the graded input labels having the minimum value for each of the respective output labels represents a maximum value, a method for determining the minimum and maximum values of the graded input labels for each of the output labels comprising the steps of:

arranging the fuzzy inference rules into a group corresponding to their respective output labels;

ordering all of the graded input labels in a numerical order according to a numerical value of the grade of each graded input label such that all of the graded input labels utilized within any particular group of fuzzy inference rules for each of the output labels are ordered in numerical order according to grade;

detecting as the minimum value for each fuzzy inference rule the graded input label within each of the fuzzy inference rules that is closest in rank to zero in the numerical order;

selecting from the graded input labels having the minimum values for each of the output labels the maximum value for a given output label wherein the graded input label that is furthest away from zero in the numerical order; and outputting the grade of the graded input label having the maximum value for each of the output labels as a final value for the output label.

2. A fuzzy logic system receiving input data and processing the data to generate an output, the fuzzy logic system comprising:

a fuzzifier for receiving the input data and generating a plurality of graded input labels according to at least one membership function;

an input label sorter coupled to the fuzzifier for receiving the plurality of graded input labels;

a rule memory coupled to the input label sorter, the rule memory having sets of valid/invalid bits stored therein representing one or more sets of fuzzy inference rules;

a plurality of registers coupled to the rule memory to receive the valid/invalid bits therefrom;

at least one min/max computing network coupled to the plurality of registers; and a defuzzifier coupled to the input label sorter, wherein the input label sorter sorts the graded input labels into a numerical order according to the grade received in the fuzzifier and communicates this order to the rule memory, and wherein the rule memory inputs valid/invalid bits into the registers in an order responsive to the numerical order determined by the input label sorter, and wherein the at least one min/max computing network reviews the valid/invalid bits within the registers to determine a position corresponding to a minimum graded input label within each of the one or more sets of fuzzy inference rules associated therewith, and wherein the at least one min/max computing network determines which of the determined minimum graded input labels of the associated one or more sets of fuzzy inference rules has been located at a position representing a maximum value, and wherein the at least one min/max computing network is further coupled to the input label sorter to indicate to the input label sorter which of the graded input labels corresponds to the maximum position, and wherein the input label sorter outputs to the defuzzifier the grade of the graded input label corresponding to the maximum position received from any or all of the at least one min/max selector, and wherein the defuzzifier generates the output.

3. A fuzzy logic system receiving input data and processing the data to generate an output, the fuzzy logic system comprising:

a fuzzifier receiving the input data and generating a plurality of graded input labels according to at least one membership function; and a min/max inference logic circuit coupled to the fuzzifier and receiving the graded input labels therefrom, wherein the min/max inference logic circuit orders the graded input labels into a numerical order within a plurality of fuzzy inference rules, each of the plurality of fuzzy inference rules organized into groups representing at least one output label, the min/max inference logic circuit determining which graded input label of each of the plurality of fuzzy inference rules has a position of minimum value, and which of the minimum values for each of the plurality of fuzzy inference rules for each of the at least one output label has a position of a maximum value, and wherein the maximum value is used to determine the output.

4. The fuzzy logic system receiving input data and processing the data to generate an output according to claim 3 wherein the min/max inference logic comprises:

an input label sorter coupled to the fuzzifier and receiving the graded input labels therefrom, wherein the input label sorter sorts the graded input labels into the numerical order.

5. The fuzzy logic system receiving input data and processing the data to generate an output according to claim 4 wherein the fuzzy logic system further comprises:

a rule memory coupled to the input label sorter, wherein the rule memory has sets of valid/invalid bits stored therein, each set of valid/invalid bits representing one of the plurality of fuzzy inference rules, and wherein the input label sorter directs the rule memory to order the sets of valid/invalid bits representing the plurality of fuzzy inference rules into the numerical order.

6. The fuzzy logic system receiving input data and processing the data to generate an output according to claim 5 wherein the min/max inference logic circuit further comprises:

a plurality of register coupled to the rule memory to receive the sets of valid/invalid bits therefrom, wherein the plurality of registers stores the sets of valid/invalid bits representing the plurality of fuzzy inference rules in the numerical order.

7. The fuzzy logic system receiving input data and processing the data to generate an output according to claim 6 wherein the min/max inference logic circuit further comprises:

at least one min/max computing network coupled to the plurality of registers, wherein the at least one min/max computing network reviews the valid/invalid bits within the registers to determine a position corresponding to a minimum graded input label within each of the one or more sets of fuzzy inference rules associated therewith, and wherein the at least one min/max computing network determines which of the determined minimum graded input labels of the associated one or more sets of fuzzy inference rules has been located at a position representing a maximum value.

8. The fuzzy logic system receiving input data and processing the data to generate an output according to claim 7 wherein the fuzzy logic system further comprises:

a defuzzifier coupled to the min/max inference logic circuit, wherein the min/max inference logic circuit outputs to the defuzzifier the grade of the graded input label having the maximum value for each of the at least one output label, and wherein the defuzzifier generates the output from the grade of the graded input labels for each of the at least one output label received from the min/max inference logic circuit.

9. The fuzzy logic system receiving input data and processing the data to generate an output according to claim 8 wherein:

each of the at least one min/max computing network is coupled to the input label sorter; and the input label sorter is coupled to the defuzzifier, wherein each of the at least one min/max computing network indicates to the input label sorter which of the graded input labels corresponds to the maximum value, and wherein the input label sorter outputs to the defuzzifier the grade of the graded input label corresponding to the maximum value received from any or all of the at least one min/max computing network.

10. The fuzzy logic system receiving input data and processing the data to generate an output according to claim 6 wherein the min/max inference logic circuit further comprises:

at least one min/max computing network coupled to the plurality of registers;

wherein the at least one min/max computing network receives the valid/invalid bits from the plurality of registers to determine a position within the input label sorter where the graded input label representing a min/max value of the valid/invalid bits is stored.

11. The fuzzy logic system receiving input data and processing the data to generate an output according to claim 3 wherein the fuzzy logic system further comprises:

a defuzzifier coupled to the min/max inference logic circuit, wherein the min/max inference logic circuit outputs to the defuzzifier the grade of the graded input label having the maximum value for each of the at least one output label, and wherein the defuzzifier generates the output from the grade of the graded input labels for each of the at least one output label received from the min/max inference logic circuit.

12. A fuzzy logic system receiving input data and processing the data to generate an output, the fuzzy logic system comprising:

a fuzzifier receiving the input data and generating a plurality of graded input labels according to at least one membership function;

an input label sorter coupled to the fuzzifier and receiving the plurality of graded input labels therefrom;

a rule memory coupled to the input label sorter, the rule memory having sets of valid/invalid bits stored therein representing one or more sets of fuzzy inference rules;

a plurality of registers coupled to the rule memory to receive the valid/invalid bits therefrom; and at least one min/max computing network coupled to the plurality of registers, wherein the input label sorter sorts the graded input labels into a numerical order according to the grade received in the fuzzifier and communicating this order to the rule memory, and wherein the rule memory inputs valid/invalid bits into the registers in an order responsive to the numerical order determined by the input label sorter, and wherein the at least one min/max computing network reviews the valid/invalid bits within the registers to determine a position corresponding to a minimum graded input label within each of the one or more sets of fuzzy inference rules associated therewith, and wherein the at least one min/max computing network determines which of the determined minimum graded input labels of the associated one or more sets of fuzzy inference rules has been located at a position representing a maximum value, and wherein the at least one min/max computing network is further coupled to the input label sorter and indicates to the input label sorter which of the graded input labels corresponds to the maximum position, and wherein the graded input label corresponds to the maximum position used to generate the output.

13. The fuzzy logic system receiving input data and processing the data to generate an output according to claim 12 wherein the fuzzy logic system further comprises:

a defuzzifier coupled to the input label sorter, wherein the input label sorter outputs to the defuzzifier the grade of the graded input label corresponding to the maximum position received from any or all of the at least one min/max selector, and wherein the defuzzifier generates the output.

* * * * *